(12) United States Patent
Steeves et al.

(10) Patent No.: US 10,389,712 B2
(45) Date of Patent: *Aug. 20, 2019

(54) PASSIVE SECURITY ENFORCEMENT (71) Applicant: Microsoft Technology Licensing, LLC, Redmond, WA (US)

(72) Inventors: David J. Steeves, Seattle, WA (US); Kim Cameron, Bellevue, WA (US); Todd L. Carpenter, Monroe, WA (US); David Foster, Bellevue, WA (US); Quentin S. Miller, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 128 days.

This patent is subject to a terminal disclaimer.

(21) Appl. No.: 15/472,962

(22) Filed: Mar. 29, 2017

(65) Prior Publication Data
US 2017/0208061 A1    Jul. 20, 2017

Related U.S. Application Data (63) Continuation of application No. 14/497,122, filed on Sep. 25, 2014, now Pat. No. 9,641,502, which is a
(Continued)

(51) Int. Cl.
*H04L 9/32*     (2006.01)
*H04L 29/06*    (2006.01)
(Continued)

(52) U.S. Cl.
CPC ........ *H04L 63/0861* (2013.01); *G06F 21/316* (2013.01); *G06F 21/32* (2013.01);
(Continued)

(58) Field of Classification Search
CPC ..... G06F 21/31; G06F 21/316; H04L 63/083; H04L 63/08; H04L 63/102
See application file for complete search history.

(56) References Cited

U.S. PATENT DOCUMENTS 6,931,538 B1    8/2005   Sawaguchi
6,941,001 B1    9/2005   Bolle et al.
(Continued)

FOREIGN PATENT DOCUMENTS

CN       1520090 A        8/2004
CN     101084524 A       12/2007
(Continued)

OTHER PUBLICATIONS

Manikandan Chidambaram, Resolving Users' Behavior Modeling Ambiguities in Fuzzy-Timed Smart Homes Using Only RFIDs (Year: 2006).*
(Continued)

*Primary Examiner* — Ali S Abyaneh
(74) *Attorney, Agent, or Firm* — Drinker Biddle & Reath LLP (57) ABSTRACT

Technology is described for enabling passive enforcement of security at computing systems. A component of a computing system can passively authenticate or authorize a user based on observations of the user's interactions with the computing system. The technology may increase or decrease an authentication or authorization level based on the observations. The level can indicate what level of access the user should be granted. When the user or a component of the computing device initiates a request, an application or service can determine whether the level is sufficient to satisfy the request. If the level is insufficient, the application or service can prompt the user for credentials so that the user is actively authenticated. The technology may enable com-
(Continued)

puting systems to "trust" authentication so that two proximate devices can share authentication levels.

12 Claims, 9 Drawing Sheets

Related U.S. Application Data continuation of application No. 14/088,202, filed on Nov. 22, 2013, now Pat. No. 8,898,758, which is a continuation of application No. 12/359,220, filed on Jan. 23, 2009, now Pat. No. 8,590,021.

(51) Int. Cl.

| | | |
|---|---|---|
| *G06F 21/31* | (2013.01) | |
| *G06F 21/32* | (2013.01) | |
| *H04W 12/06* | (2009.01) | |
| *H04L 29/08* | (2006.01) | |

(52) U.S. Cl.
CPC .......... *H04L 63/0492* (2013.01); *H04L 63/08* (2013.01); *H04L 67/10* (2013.01); *H04W 12/06* (2013.01); *H04L 2463/082* (2013.01)

(56) References Cited

U.S. PATENT DOCUMENTS

| | | | |
|---|---|---|---|
| 7,079,652 | B1 | 7/2006 | Harris |
| 7,185,198 | B2 | 2/2007 | Nakamura et al. |
| 7,908,237 | B2 | 3/2011 | Angell et al. |
| 8,234,499 | B2 | 7/2012 | Abraham et al. |
| 2003/0158815 | A1 | 8/2003 | Yoshida et al. |
| 2004/0083394 | A1 | 4/2004 | Brebner et al. |
| 2004/0221171 | A1 | 11/2004 | Ahmed et al. |
| 2005/0071671 | A1 | 3/2005 | Karaoguz |
| 2005/0171741 | A1* | 8/2005 | Doi .................... G06K 9/00248 702/189 |
| 2006/0288234 | A1 | 12/2006 | Azar et al. |
| 2006/0291657 | A1 | 12/2006 | Benson et al. |
| 2007/0005988 | A1 | 1/2007 | Zhang et al. |
| 2007/0118909 | A1 | 5/2007 | Hertzog et al. |
| 2007/0143825 | A1 | 6/2007 | Goffin |
| 2007/0143837 | A1 | 6/2007 | Azeez et al. |
| 2007/0157304 | A1 | 7/2007 | Logan et al. |
| 2007/0178882 | A1 | 8/2007 | Teunissen et al. |
| 2007/0180047 | A1 | 8/2007 | Dong et al. |
| 2007/0180504 | A1 | 8/2007 | Hung |
| 2007/0236330 | A1 | 10/2007 | Cho et al. |
| 2008/0033637 | A1 | 2/2008 | Kuhlman et al. |
| 2008/0037832 | A1 | 2/2008 | Phoha |
| 2008/0049985 | A1 | 2/2008 | Wang et al. |
| 2009/0049544 | A1* | 2/2009 | Kashi .................... H04L 9/3226 726/19 |
| 2009/0199264 | A1* | 8/2009 | Lang .................... G06F 21/31 726/1 |
| 2009/0222304 | A1 | 9/2009 | Higgins et al. |
| 2009/0260075 | A1* | 10/2009 | Gedge ................ H04L 63/0861 726/17 |
| 2010/0158220 | A1 | 6/2010 | Silverman |
| 2010/0211997 | A1 | 8/2010 | McGeehan et al. |
| 2011/0257992 | A1 | 10/2011 | Scantland et al. |
| 2012/0005192 | A1 | 1/2012 | Bao et al. |
| 2012/0036255 | A1 | 2/2012 | Polsky |
| 2012/0204257 | A1 | 8/2012 | O'Connell et al. |

FOREIGN PATENT DOCUMENTS

| | | |
|---|---|---|
| CN | 101212239 A | 7/2008 |
| CN | 101251894 A | 8/2008 |
| CN | 101296821 A | 10/2008 |
| DE | 19631484 C1 | 3/1998 |
| DE | 102007017384 A1 | 10/2008 |
| JP | 2002251380 A | 9/2002 |
| JP | 2003078952 A | 3/2003 |
| JP | 2003196566 A | 7/2003 |
| JP | 2004306821 A | 11/2004 |
| JP | 2004310207 A | 11/2004 |
| JP | 2005528662 A | 9/2005 |
| WO | 2006038290 A1 | 4/2006 |

OTHER PUBLICATIONS

"Atrua Premiers First of Kind Intelligent Touch-Based System for Mobile Phones", In Atrua Technologies, 1696 Dell Avenue, Campbell, WA 95008, Feb. 23, 2004, 3 Pages.
"Biometric User Authentication: Fingerprint Sensor Product Guidelines", In Intel Corporation, Nov. 2003, 51 Pages.
"Supplementary Search Report Issued in European Patent Application No. 10733755.2", dated May 15, 2014, 11 Pages.
"Final Office Action Issued in U.S. Appl. No. 12/359,220", dated Jul. 10, 2012, 18 Pages.
"Non-Final Office Action Issued in U.S. Appl. No. 12/359,220", dated Dec. 23, 2011, 21 Pages.
"Notice of Allowance Issued in U.S. Appl. No. 12/359,220", dated Jul. 22, 2013, 6 Pages.
"Notice of Allowance Issued in U.S. Appl. No. 14/088,202", dated Jun. 25, 2014, 19 Pages.
"Notice of Allowance Issued in U.S. Appl. No. 14/497,122", dated Jan. 5, 2017, 16 Pages.
"Office Action Issued in Canadian Patent Application No. 2,748,201", dated Feb. 8, 2016, 4 Pages.
"Fourth Office Action Issued in Chinese Patent Application No. 201080005584.1", dated Aug. 20, 2015, 17 Pages.
"Office Action Issued in Chinese Patent Application No. 201080005584.1", dated Mar. 21, 2014, 12 Pages.
"Office Action Issued in Chinese Patent Application No. 201080005584.1", dated Jul. 14, 2014, 13 Pages.
"Office Action Issued in Chinese Patent Application No. 201080005584.1", dated Nov. 14, 2013, 16 Pages.
"Notice of Allowance Issued in Japanese Patent Application No. 2011-548011", dated Apr. 1, 2014, 3 Pages.
"Office Action Issued in Japanese Patent Application No. 2011-548011", dated Dec. 3, 2013, 11 Pages.
Chidambaram, et al., "Resolving Users' Behavior Modeling Ambiguities in Fuzzy-Timed Smart Homes using only RFIDs", In Proceedings of International Journal of Computer Science and Network Security, vol. 6, Issue 11, Nov. 2006, pp. 179-184.
Laukkanen, Mikko, "Towards Operating Identity-based NFC Services", In IEEE International Conference on Pervasive Services, Jan. 2007, 4 Pages.
Weidong, et al., "Detection of Human Body Motion Features using Pyroelectric Infrared Sensor", In Journal of Scientific Instrument, vol. 29, Issue 05, May 31, 2008, pp. 1021-1022.
"Office Action Issued in Indian Patent Application No. 5071/CHENP/2011", dated Oct. 11, 2018, 6 Pages.

\* cited by examiner

PASSIVE SECURITY ENFORCEMENT

CROSS-REFERENCE TO RELATED APPLICATIONS

This application is a continuation of U.S. application Ser. No. 14/497,122, filed Sep. 25, 2014, and issued as U.S. Pat. No. 9,641,502, which is a continuation of U.S. application Ser. No. 14/088,202, filed Nov. 22, 2013, and issued as U.S. Pat. No. 8,898,758, which is a continuation of U.S. application Ser. No. 12/359,220, filed Jan. 23, 2009, and issued as U.S. Pat. No. 8,590,021, which are hereby incorporated by reference in their entirety. In cases in which a document incorporated by reference herein is inconsistent with contents of this application, the contents of this application control.

BACKGROUND

Many computing systems provide various features to enforce security. Enforcing security includes evaluating and enforcing authentication and authorization. Computing devices employ authentication to securely identify users. A computing device generally employs an authentication component to determine who a user is and whether the user is really who they claim to be. A concept related to authentication is authorization. Computing systems employ authorization to determine the level of access for the authenticated user. For example, a computing system may evaluate authorization rules to determine what features or resources an authenticated user should be provided access to (e.g., to access, add, create, delete, modify, etc.) Once a computing system authenticates a user, the computing system may provide various features to the user based on that user's authorization. The computing system can employ an authorization component to determine the appropriate level of authorization, such as by enforcing authorization rules.

Computing systems conventionally enforce security actively. Active authentication generally includes receiving authentication information directly from a user who is to be authenticated. As examples, users may provide login credentials (e.g., user id and/or password), place a card key or other device proximate to a user, or take some other active step to identify and/or authenticate themselves. Thus, active authentication generally involves verifying a "secret" that is shared between the user and the computing system or validating a user's response to a challenge. Active authorization includes enforcing rules based on the authentication.

However, authentication can sometimes get in the way of authorization when some features or transactions provided by a computing system require a different "level" of authentication than other features. As an example, when the computing system is a mobile telephone, a user may require a first level of authentication to place local phone calls and a second, different level of authentication to place long distance phone calls or conduct an electronic commerce transaction. As another example, the user may need a third level of authentication to browse public Internet websites but a fourth, different level of authentication to send or receive electronic mail.

Although features provided by a computing system can be divided into different categories, such divisions are ineffective when, e.g., the user is not yet authenticated, authenticating a user actively is unnecessary, or a feature requires a different level of authorization than the level that can be provided to the authenticated user.

SUMMARY

Technology is described for enabling passive security enforcement at computing systems ("the technology"). A component of a computing system can passively authenticate or authorize a user based on observations of the user's interactions with the computing system. The observations can include, e.g., physical observations of the user's interactions, behavioral observations of the user's usage of the computing system, etc. The technology may increase or decrease an authentication level or authorization level based on the observations. The level can indicate what level of access the user should be granted. When the user or a component of the computing device initiates a request, an application or service can determine whether the level is sufficient to satisfy the request. If the level is insufficient, the application or service can prompt the user for credentials so that the user is actively authenticated. The level may change over time, such as based on observed actions of the user.

The technology may enable computing systems to "trust" authentication so that two proximate devices can share authentication levels. When the computing device is placed near another computing device that has also authenticated the user, the authentication levels for the user at one or both devices may increase.

In various embodiments, physical observation can include proximity of other devices so that, for example, a mobile computing system may provide a higher authentication level if the user is carrying another device, such as a car ignition key embedded with embedded electronics (also know as a "key fob"). When the previously recognized key fob is no longer proximate to the computing system, the computing system may decrease the authentication level it passively provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is described for enabling passive security enforcement at computing systems, e.g., mobile computing devices ("the technology"). A component of a computing system can passively authenticate or authorize a user based on observations of the user's interactions with the computing system. The observations can include, e.g., physical observations of the user's interactions, behavioral observations of the user's usage of the computing system, etc. As examples, physical observations can include, e.g., observations of heat or temperature sensors, pressure/touch sensors, motion sensors/accelerometers, proximity of other devices, and so forth. Behavioral observations can include, e.g., observations of whether the user is telephoning people in a previously stored contacts list, is located in an area where the user has been previously observed to be located, and so forth. If the user's physical and/or behavioral observations are consistent with prior patterns, the user may be passively authenticated at an observed authentication "level." If several observations are consistent with prior patterns, the level may increase. On the other hand, if only few observations are consistent with prior patterns or some observations are inconsistent with prior patterns, the level may decrease. The technology may make observations by using various hardware and software components to detect changes to various inputs that are made to the computing system.

When the user accesses a feature or requests a transaction, an associated application or service may determine from the computing system (e.g., by accessing an application program interface ("API") provided by an operating system executing on the computing system) what level of authentication the technology has passively observed. If the authentication level is sufficiently high (e.g., exceeds a specified threshold level), the application or service may complete the request. As an example, when the user places a local telephone call to a telephone number that is not in the contacts list, the computing system may initiate the call. As another example, when the user browses a public website, the computing system may cause the web browser to place the request to a web server.

These authorizations may occur because the user, system administrator, application, or other entity determined that these features/transactions may be performed at the present authentication level. As an example, a local phone call may be "free" but a long distance phone call may cause the user to incur a fee. As another example, browsing a public website may be "free" and of acceptable risk, but checking a bank balance or purchasing an item online may involve unacceptable risk at the present authentication level.

If the authentication is not sufficiently high for the requested feature or transaction, the application or service may either return an error or require active authentication. To actively authenticate a user, the operating system may require the user to provide the user's authentication credentials. As an example, when the user places a long distance telephone call, the computing system may not place the telephone call and instead may prompt the user for the user's login credentials. After verifying the login credentials actively, the computing system may place the call. As another example, when the user requests a financial transaction to a service using the browser, the service may require a high authentication level. Upon determining that the present authentication level is lower than a threshold the service specifies, the computing system may prompt the user for the user's login credentials. After verifying the login credentials the user provides, the computing system may inform the service that the user's authentication level is sufficiently high to complete the transaction. Alternatively, the service may determine based on the provided credentials that the requested transaction can be completed. In various embodiments, the API may indicate the authentication level to an inquiring service, merely inform the service that the user's authentication level exceeds a specified threshold or not, or even transmit credentials to the service. As an example, upon receiving a request to complete a transaction, the service may first send a request to the user's computing system indicating that the service requires a specified authentication level. If the user's computing system determines that the user's present authentication system is too low, it may either prompt the user to enter one or more credentials or inform the service that the authentication level is too low. In the latter case, the service may prompt the user to provide credentials so that the service can authorize the user.

The computing system may also passively authorize users, such as by employing techniques similar to those described above for passive authentication. As an example, after the user has been passively authenticated, the user may request a transaction that requires a stronger level of authentication. An authorization component may have passively determined that the user is or is not authorized to request the transaction. If the user is not authorized to request the transaction, the transaction will not be completed. In various embodiments, the computing device may cancel the request or provide relevant information so that a service or application that satisfies the request can determine whether or not the transaction should be completed.

Authentication and authorization may be for different time periods. As an example, the computing system may authenticate a user for a given "session" (e.g., during a period of time) but may authorize each transaction separately.

In various embodiments, the technology may enable computing systems to "trust" authentication. As an example, the computing systems may employ near-field communications technology to communicate authentication information with each other. If the user has a higher level of authentication on either computing system, both computing systems may recognize the higher authentication level. As an example, when a user of a mobile phone has been passively authenticated but has not been authenticated on a "surface" computing system and places the mobile phone on the surface computing system, the surface computing system may automatically authenticate the user so that, e.g., the user's photos on the phone can be displayed on the surface computing system. Alternatively, if the user has already authenticated actively on one computing system, another proximate computing system may enable the user to perform activities that it previously would not have authorized without first prompting the user for active authentication information.

The authentication level may change over time. As an example, if the user begins telephoning users not in the user's contacts list, the authentication level may decrease. If the authentication level decreases lower than a specified threshold, the user may no longer be able to make telephone calls until the user is prompted for authentication credentials and is (actively) authenticated.

In various embodiments, physical observation can include proximity of other devices. As an example, a mobile computing system may provide a higher authentication level if the user is carrying another device, such as a key fob. When the previously recognized key fob is no longer proximate to the computing system, the computing system may decrease the authentication level it passively provided.

In various embodiments, the technology can employ geographic position information (e.g., based on radio triangulation, satellite global positioning system information, etc.) to determine that the user should be actively authenticated or authorized. For example, this may occur when the position information indicates that the user is outside areas that the user normally visits.

In various embodiments, the technology may not initially offer passive authentication or authorization because it has not yet observed and stored attributes of actions. As an example, when a user first purchases a mobile computing device, the mobile computing device may only offer active authentication and authorization. In such a case, the user may need to actively authenticate before accessing a feature or requesting a transaction. Over time, as the technology observes and stores usage patterns (e.g., after one or more instances of a user using the device), the technology may enable passive authentication and/or passive authorization.

In various embodiments, the technology may store default values and then update the default values based on observation. In these embodiments, a limited set of features or transactions may be available to the user immediately and more features or transactions may become available (e.g., "unlocked") as the technology "learns" to passively authenticate the user, such as by detecting and storing attributes of actions.

In various embodiments, the technology may enable users to configure whether/when to enable passive and/or active authentication/authorization. As examples, a user may specify what transactions or features should be enabled with passive authentication.

As previously indicated, the technology may make observations by using various hardware and software components to detect changes to various inputs that are made to the computing system. Thus, detection and observation are intended to be synonymous.

Several embodiments of the facility are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the technology. In addition, the data structures and message structures may be stored or transmitted via a data transmission medium, such as a signal on a communications link. Various communications links may be used, such as the Internet, a local area network, a wide area network, or a point-to-point dial-up connection.

Figure 1:
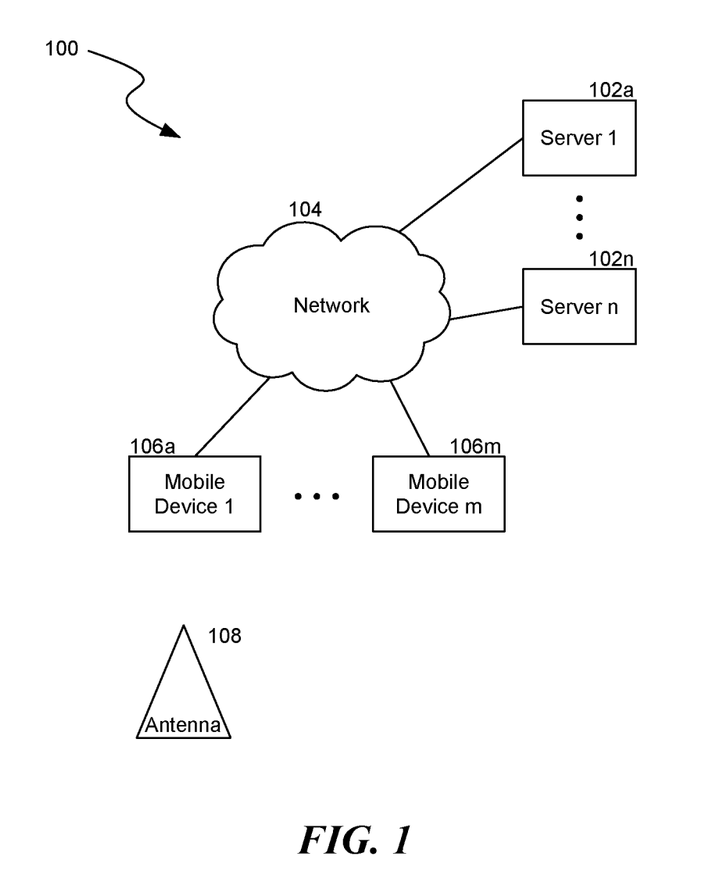
FIG. 1 is a block diagram illustrating components employed by the technology in various embodiments.

FIG. 1 is a block diagram illustrating components employed by the technology in various embodiments. The environment 100 in which the technology operates can include one or more servers 102a through 102n, a network 104 (e.g., an intranet or the Internet), and one or more computing devices, such as mobile computing devices 106a through 106m. Other varieties of computing devices can also be employed. The mobile computing devices may be handheld devices, such as mobile telephones. The mobile computing devices may wirelessly communicate with other devices, such as to communicate voice, video, or other information, via an antenna 108. The antenna 108 can exchange radiofrequency or other signals with a corresponding antenna (not shown) associated with the mobile computing devices.

Figure 2:
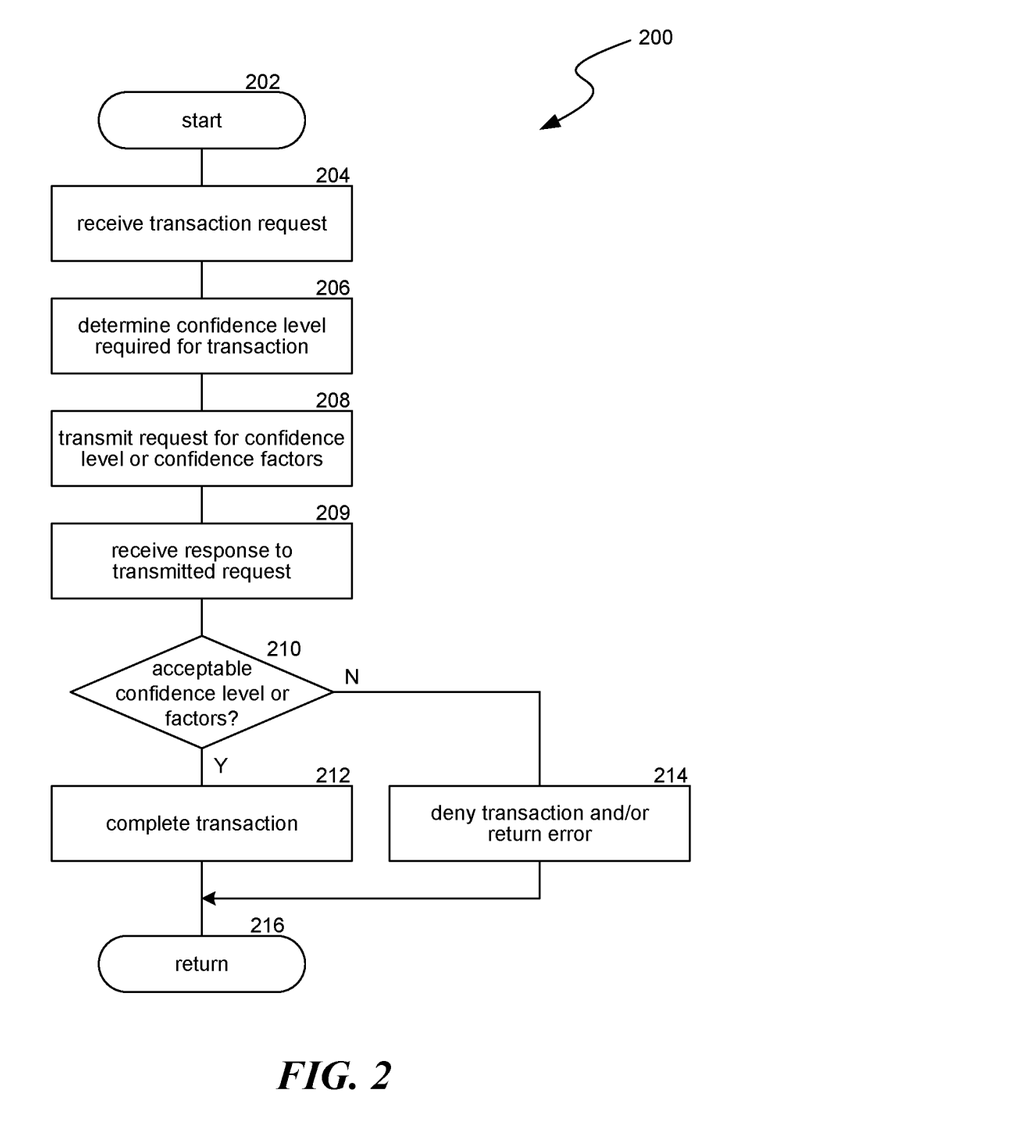
FIG. 2 is a flow diagram illustrating a routine performed by a service upon receiving a request from a client to complete a transaction.

FIG. 2 is a flow diagram illustrating a routine performed by a service upon receiving a request from a client to complete a transaction. The routine 200 begins at block 202. At block 204, the routine receives a transaction request, such as from a mobile computing device. The transaction request may be generated by the mobile computing device when the user or some other entity initiates a transaction. In various embodiments, the transaction may be completely performed at the mobile computing device or may require exchange information with a service. As an example, the routine may be invoked by the mobile computing device when the mobile computing device receives a request to execute an application. As another example, the routine may be invoked by a service when it receives a request to complete a financial transaction. At block 206, the routine determines a confidence level that may be required to complete the transaction. At block 208, the routine transmits a request for the identified confidence level to the component that transmitted the transaction request. A confidence level may be a threshold level of confidence that is required for the transaction to be automatically authorized without requiring the user to be actively authenticated. Alternatively, the routine may transmit indications of one or more confidence factors to the component that transmitted the transaction request. Confidence factors may be specific factors that are acceptable, such as fingerprints, iris scans, signatures, etc. At block 209, the routine receives from the component that transmitted the transaction request a response providing an indication of the confidence level or confidence factors that have been verified. At decision block 210, the routine determines whether the received confidence level or factors are acceptable (e.g., exceed a specified threshold). If the confidence level or factors are acceptable, the routine continues at block 212. Otherwise, the routine continues at block 214. At block 212, the routine completes the transaction. The routine then returns at block 216. At block 214, the routine denies the transaction and may return an error to the component that transmitted the transaction request. The routine then returns at block 216.

Those skilled in the art will appreciate that the logic illustrated in FIG. 2 and described above, and in each of the flow diagrams discussed below, may be altered in a variety of ways. For example, the order of the logic may be rearranged, substeps may be performed in parallel, illustrated logic may be omitted, other logic may be included, etc. Moreover, some or all of the logic or substeps may be performed by one or more devices other than a specified device. For example, substeps may occur on a mobile computing device, client computing device, server computing device, etc.

Figure 3:
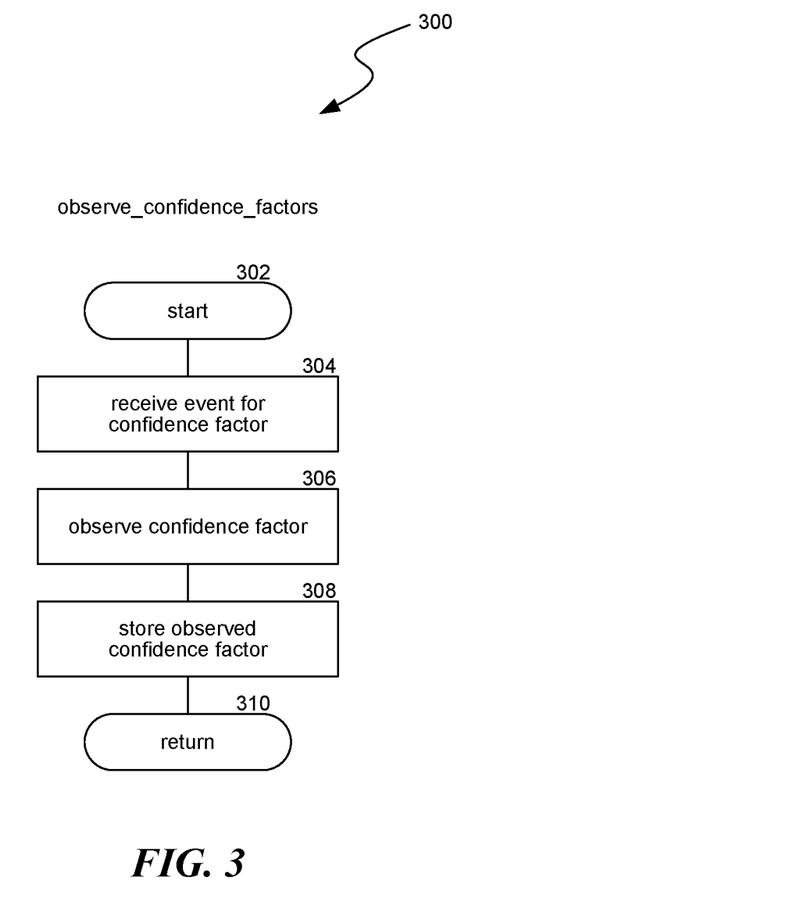
FIG. 3 is a flow diagram illustrating a routine performed by a computing system to observe confidence factors.

FIG. 3 is a flow diagram illustrating a routine performed by a computing system to observe confidence factors. The routine 300 begins at block 302. At block 304, the routine receives an event for a confidence factor. As examples, the routine may receive events indicating that the user has picked up a mobile phone, the user has rotated the mobile phone, the present temperature at various points on the mobile phone, the user's usage patterns on the computing device, etc. At block 306, the routine observes the confidence factor. As an example, the routine may observe values at various sensors, accelerometers, keyboard, stylus, or other input devices. At block 308, the routine stores the search confidence factors, such as in a data structure stored in memory. At block 310, the routine returns.

Figure 4:
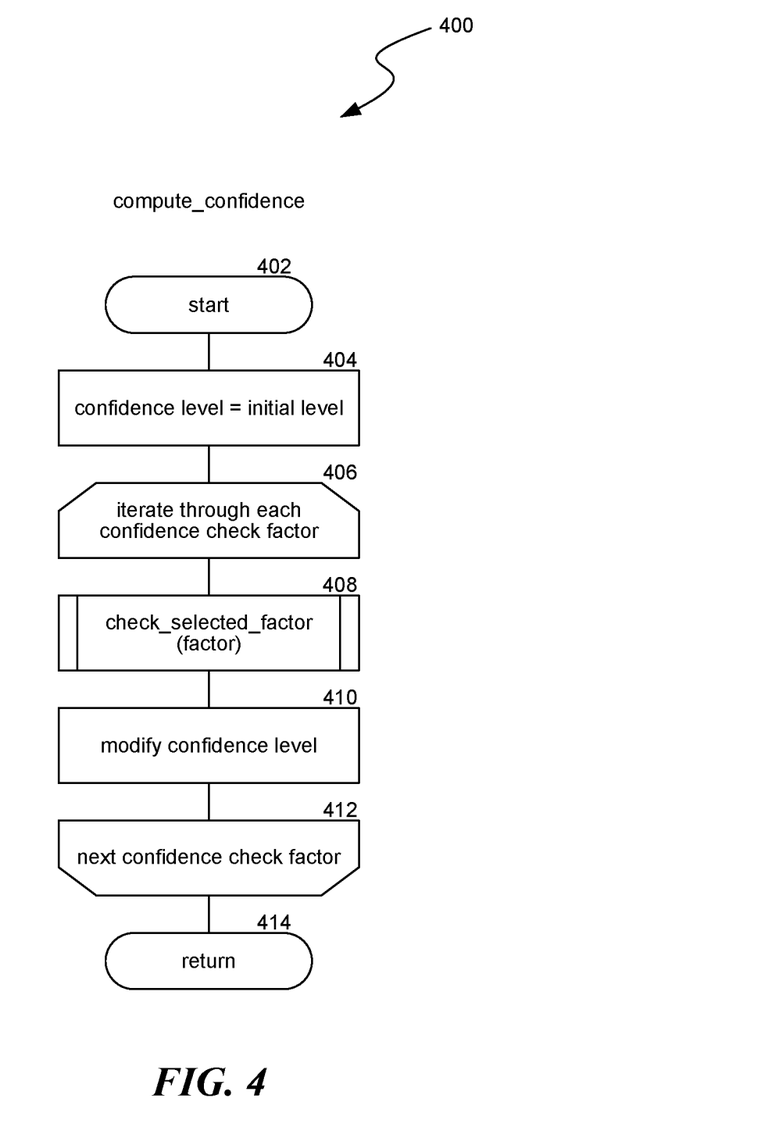
FIG. 4 is a flow diagram illustrating a routine performed by a computing system to compute a confidence level.

FIG. 4 is a flow diagram illustrating a routine performed by a computing system to compute a confidence level. The routine 400 may be invoked to compute a confidence level, such as when prompted by a service or an application. The routine begins at block 402. At block 404, the routine sets a confidence level to an initial level, such as a default level. In the loop of blocks 406-412, the routine modifies the confidence level based on each confidence factor. At block 406, the routine selects a confidence factor, such as from a list of observed confidence factors. At block 408, the routine checks the selected confidence factor, such as by invoking a subroutine and providing the selected confidence factor to the subroutine. A subroutine for checking the selected confidence factor is described in further detail below in relation to FIG. 7. At block 410, the routine modifies the confidence level based on a value returned by the subroutine for checking the selected confidence factor. As an example, routine may increase the confidence level if the factor is indicated to be geographical location or name of a network to which the computing device has connected. The routine selects another confidence factor at block 412. At block 414, the routine returns.

Figure 5:
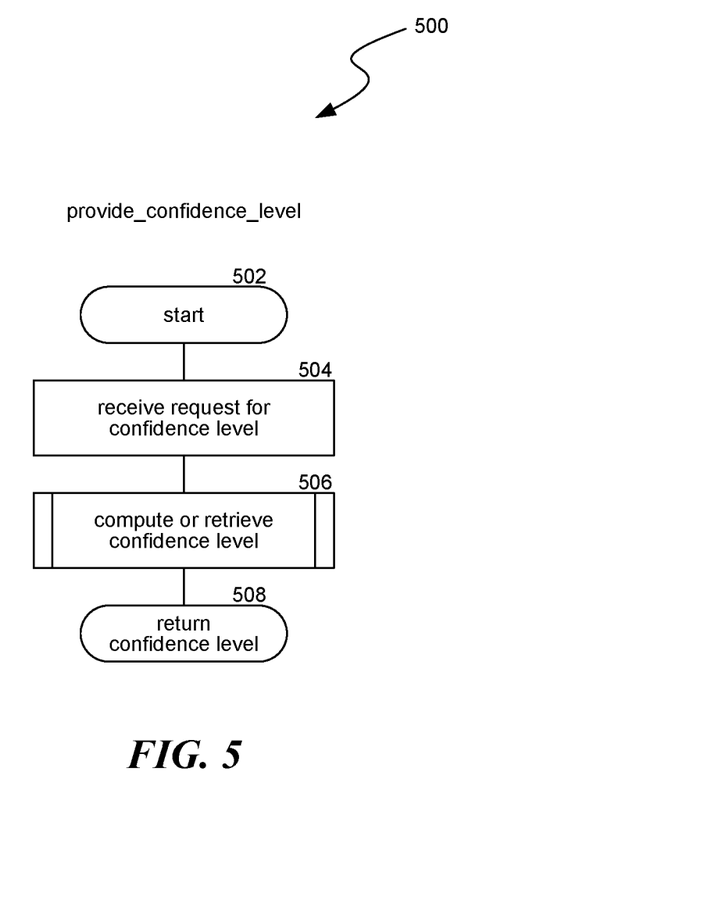
FIG. 5 is a flow diagram illustrating a routine performed by a computing system to provide a confidence level.

FIG. 5 is a flow diagram illustrating a routine performed by a computing system to provide a confidence level. The routine 500 may be invoked to provide a confidence level. The routine begins at block 502. At block 504, the routine receives a request for a confidence level. At block 506, the routine computes or retrieves a confidence level, such as by invoking the subroutine. As an example, the routine may invoke the routine described above in relation to FIG. 4 or may invoke the routine described below in relation to FIG. 6. At block 508, the routine returns the computed or retrieved confidence level.

Figure 6:
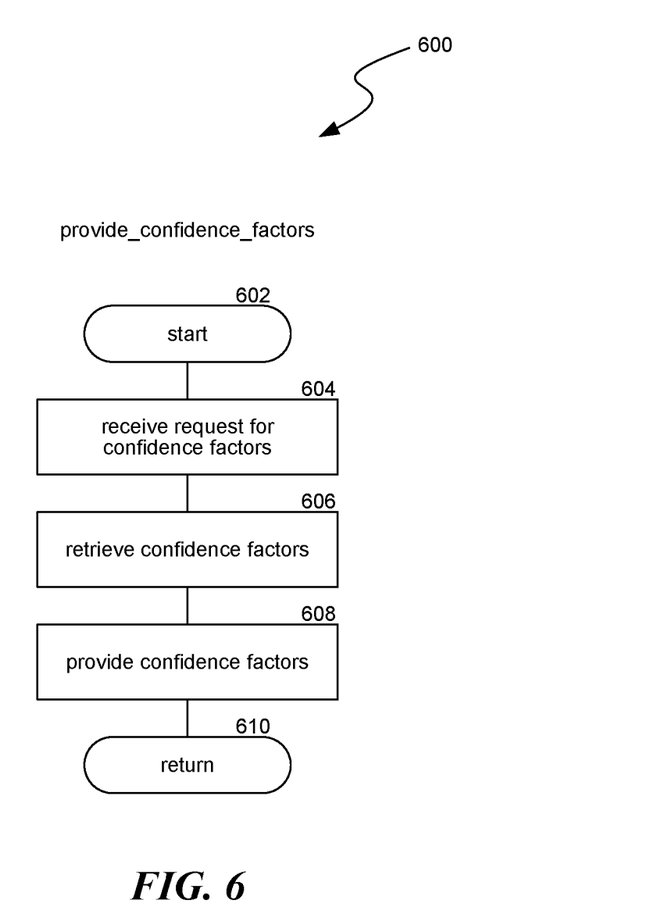
FIG. 6 is a flow diagram illustrating a routine performed by a computing system to provide confidence factors.

FIG. 6 is a flow diagram illustrating a routine performed by a computing system to provide confidence factors. The routine 600 may be invoked to provide a list of confidence factors and associated observations. The routine begins at block 602. At block 604, the routine receives a request for confidence factors. At block 606, the routine retrieves the confidence factors. In various embodiments, the routine may receive a list of the confidence factors that it is to retrieve and provide. In various embodiments, the routine may provide the complete list of confidence factors. At block 608, the routine provides the confidence factors. At block 610, the routine returns.

Figure 7A:
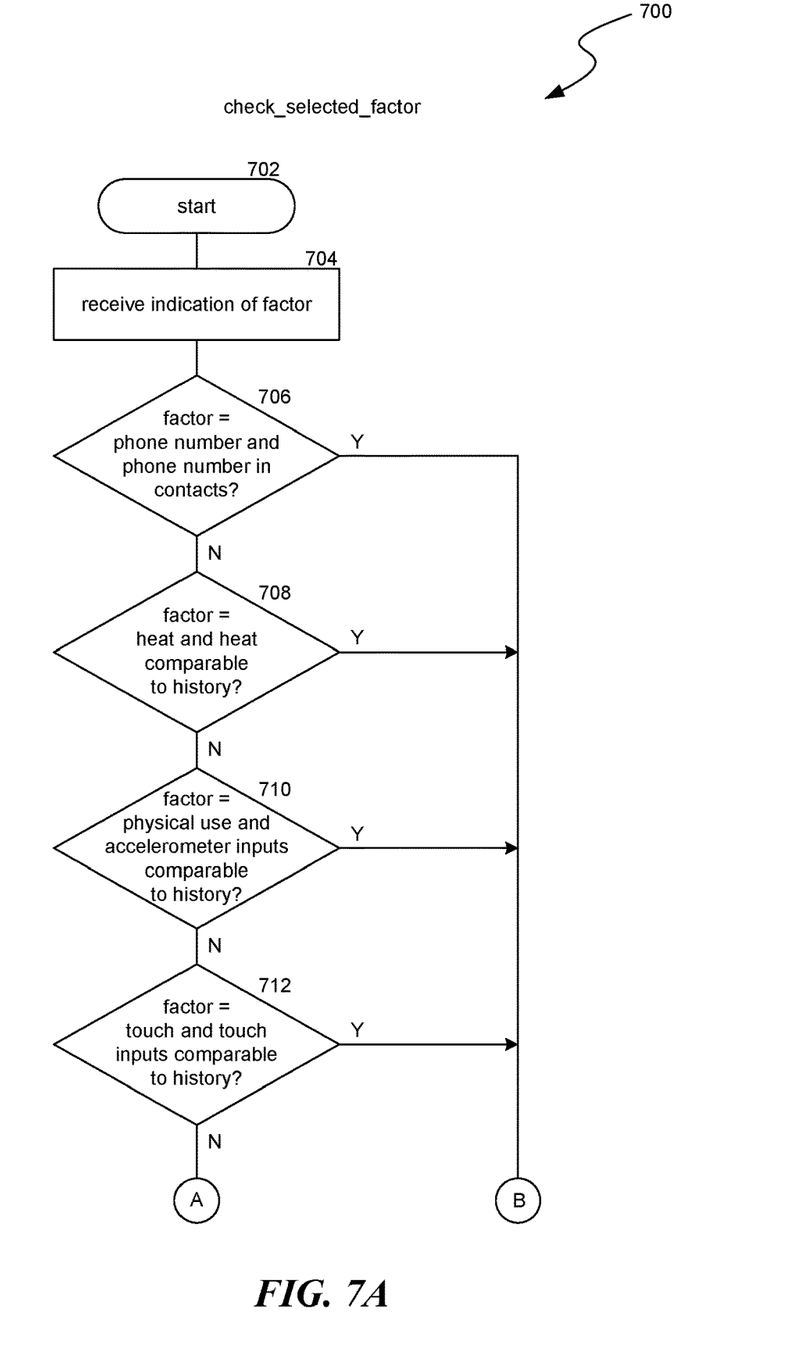
FIGS. 7A and 7B are flow diagrams illustrating a routine performed by a computing system to check selected confidence factors.
Figure 7B:
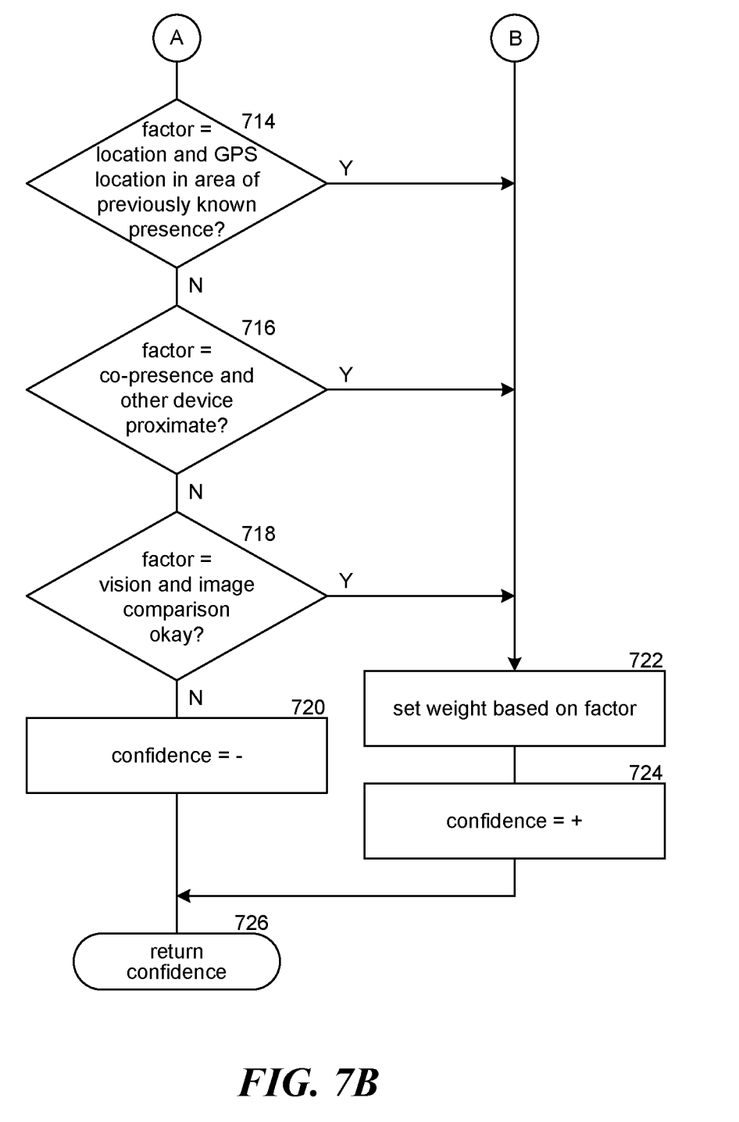

FIGS. 7A and 7B are flow diagrams illustrating a routine performed by a computing system to check selected confidence factors. The routine may compare attributes of a presently observed action with previously stored attributes of a similar action. Attributes can include inputs observed from components that provide input to the computing system, e.g., accelerometer inputs, touch/pressure sensor inputs, temperature inputs, global positioning system (GPS) inputs, etc. Presently observed attributes can be substantially equivalent to previously stored attributes when the differences are negligible. As an example, there may be temperature variations between fingers, but overall the fingers exhibit similar temperatures to those measured previously. The inputs may be considered as a group (e.g., temperatures for all fingers) or individually (e.g., temperatures for each finger).

The routine 700 begins at block 702. FIG. 7A indicates connectors A. and B. These connectors connect the flow of the routine to connectors A. and B., respectively, illustrated in FIG. 7B. At block 704, the routine receives an indication of a confidence factor.

At decision block 706, the routine determines whether the indicated confidence factor is a phone number and the phone number is listed in a list of phone numbers, such as in a list of contacts or telephone numbers previously entered regularly or several times. If so, the routine continues at block 722. Otherwise, the routine continues at decision block 708.

At decision block 708, the routine determines whether the indicated confidence factor is heat (or temperature) and the observed heat that is presently applied by the user is comparable to historically observed heat applied by the user. The heat may be observed by checking heat sensors that may be attached to the computing device. As an example, a mobile phone may have one or more heat sensors that each measure heat applied by a user's hand. If the observed heat is comparable to historically observed heat, the routine continues at block 722. Otherwise, the routine continues at decision block 710.

At decision block 710, the routine determines whether the indicated confidence factor is physical use and one or more accelerometers associated with the computing device provide inputs that are comparable to historical physical use indicated by the accelerometers. The accelerometers may measure how the user interacts with the computing device, such as when picking it up, putting it down, and so forth. If the observed use is consistent with historically observed use, the routine continues at block 722. Otherwise, the routine continues at decision block 712.

At decision block 712, the routine determines whether the indicated confidence factor is touch and touch inputs are presently providing information that are comparable to historically observed information from the touch inputs. The touch inputs may be received from touch sensitive sensors associated with the computing device. If the observed text inputs are consistent with historically observed touch inputs, the routine continues at block 722. Otherwise, the routine continues at decision block 714 (illustrated in FIG. 7B).

Turning now to FIG. 7B, at decision block 714, the routine determines whether the indicated confidence factor is location and a GPS signal indicates that the computing system is presently located in an area in which the user has previously operated the computing system. As an example, when the computing system is in an area in which the user has never previously used the computing system, the confidence level may be low that the previously known user is presently using the computing system. If the location is in an area in which the user has previously used a computing system, the routine continues at block 722. Otherwise, the routine continues at decision block 716. Other location-related inputs can also (or instead) be applied, such as by identifying available wireless local area networks or devices connected thereto, recognizing the surroundings using a camera, etc.

At decision block 716, the routine determines whether the indicated confidence factor is co-presence and another device is proximate to the computing system. As an example, when a user has a mobile device in one pocket and car keys (previously registered with the mobile device) in another pocket, it is likely that the user is the known owner of the mobile device. The car keys may have an embedded component, such as a radiofrequency identification chip, that enables the mobile device to identify the car keys (or any other co-present device that is registered). If the registered co-present device is proximate, the routine continues at block 722. Otherwise, the routine continues at decision block 718.

At decision block 718, the routine determines whether the identified confidence factor is vision and the image comparison is acceptable. As an example, the routine may determine whether the user's face is recognizable, the surroundings are recognizable, etc. The computing system may employ an attached camera to make this visual observation. If the image comparison is acceptable, the routine continues at block 722. Otherwise, the routine continues at block 720.

At block 720, the routine decreases the confidence level because none of the indicated confidence factors was acceptable. The routine then returns the confidence level at block 726.

At block 722, the routine sets a weight based on the factor that was acceptable. At block 724, the routine increases the confidence level. In some embodiments, the routine may employ weights for each of the confidence factors (and not just one) and compute an overall weighted confidence level. The routine then returns the computer confidence level at block 726.

Historical information employed by the routine may be stored in the computing device or elsewhere. If stored elsewhere, the computing device may access the historical information via a network connection.

Figure 8:
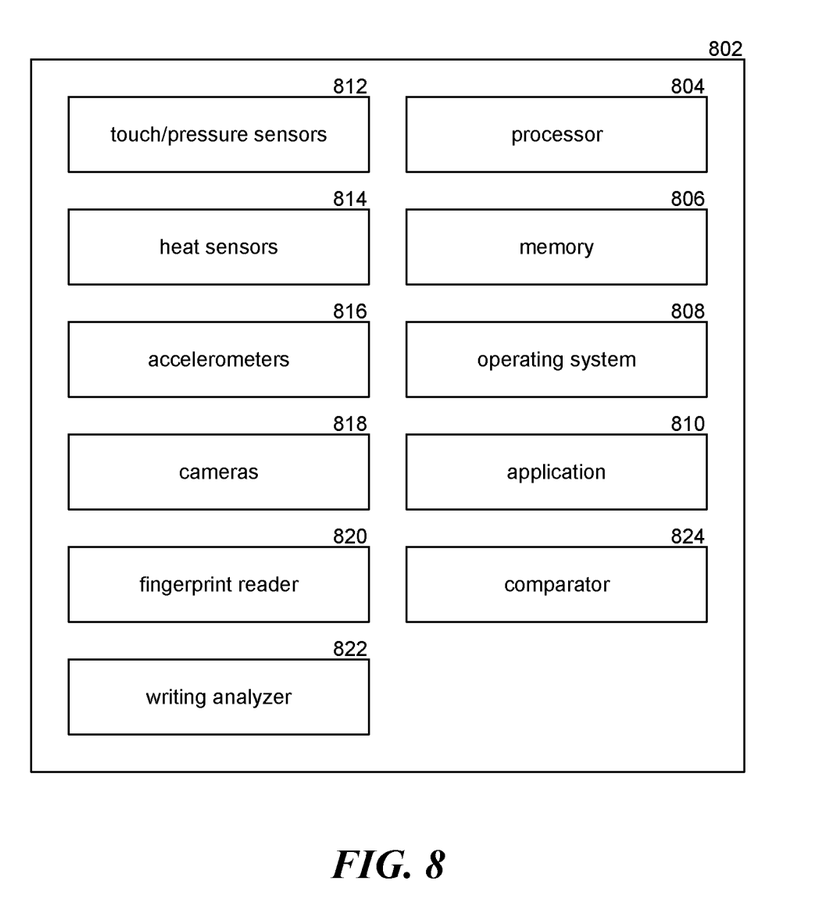
FIG. 8 is a block diagram illustrating components employed by the technology in various embodiments.

FIG. 8 is a block diagram illustrating components employed by the technology in various embodiments. A computing system 802, such as a mobile computing device, may include a processor 804, a memory 806, an operating system 808, and one or more applications 810. An application may require authentication of the user or send a request to a service via a network connection (not illustrated) that requires authentication of the user.

The computing system may also include touch/pressure sensors 812, heat sensors 814, accelerometers 816, cameras 818, fingerprint readers 820, and writing analyzers 822. The touch/pressure sensors may determine touch or pressure points around the body of the computing system. The heat sensors may sends heat at one or more points around the body of the computing system. The accelerometers may determine how the computing system is picked up, moved, etc., by the user. An accelerometer can be an electromechanical device that measures acceleration forces, e.g., static forces or dynamic forces. The cameras may observe the user's face, the surroundings, etc. The fingerprint readers may read the user's fingerprints. The writing analyzers may analyze how the user writes, such as by using a stylus. The computing system may also include comparators 824. Comparators may be configured to compare presently observable attributes (e.g., heat, pressure, motion, etc.) to previously stored attributes. Although the components are described in plural, computing systems may use one of each type of component, or just some of the components.

Various embodiments of the technology are now described. The embodiments may be operated independently or may be combined.

The technology can include a method performed by a computing system for passively authenticating a user, comprising: observing an attribute of an action; comparing the observed attribute of the action to a previously stored attribute of a similar action; determining whether the observed attribute is substantially equivalent to the previously stored attribute of the similar action; and if the observed attribute is substantially equivalent to the previously stored attribute of the similar action, passively authenticating the user without requiring the user to actively authenticate. The action can be moving the computing system to a location that is identifiable by the computing device. The observing can include capturing an image of surroundings using a camera. The observing can include receiving GPS location information. The observing can include identifying a wireless local area network connection. The action can be making a telephone call. The attribute when making a telephone call can be a telephone number to which the telephone call is made and the previously stored attribute can be a telephone number stored in a list of contacts. The action can be detecting temperature. The action can be detecting motion. The action can be detecting pressure. The action can be detecting co-presence of another device. The action can be recognizing a face. The method can include setting a confidence level based on two or more comparisons of attributes of actions and passively authenticating the user when the confidence level exceeds a specified threshold confidence level.

The technology can include a computer-readable medium storing computer-executable instructions that, when executed, perform a method of passively authenticating a user. The method can comprise: setting a confidence level to a default value; identifying a set of confidence factors; for each identified confidence factor, computing a confidence and modifying the confidence level based on the computed confidence; and if the modified confidence level exceeds a specified threshold, passively authenticating the user without requiring the user to actively authenticate. The method can include setting a weight for each identified confidence factor. The modifying can be based on the weight. The method can include increasing the confidence level upon receiving a signal from a proximate computing device that has also authenticated the user.

The technology can include a system for passively authenticating a user, comprising: an application that initiates a request; and a comparator component that is configured to compare an observed input to a previously stored input without prompting the user to provide the observed input and, if the comparison is substantially equivalent, passively authenticates the user so that the initiated request can be satisfied. The system can include a server component that satisfies the request. The application may satisfy the request if the user is passively authenticated; and if the user could not be passively authenticated, can prompt the user for authentication credentials so that the user can be actively authenticated.

Many authentication schemes are "active" in that they require the user to provide a secret shared with the computing system, such as a password. However, active authentication gets in the way of completing simple tasks on mobile computing systems, such as making a local call using a "smart" phone that is locked to comply with corporate security policies. The technology can employ passive authentication to authenticate a user based on the user's observed behavior. The user's authentication level can increase or decrease over time based on the user's observed actions, and applications/services can determine whether or not to satisfy a request or complete a transaction based on the present authentication level.

Confidence level and authentication level can be synonymous in various embodiments. Although embodiments relating to passive authentication are described, the embodiments may also apply equally to passive authorization.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for passive authentication by a computing system, the method comprising:
   receiving, by the computing system, a first attribute;
   passively authenticating, by the computing system, a user
      at a first authentication level based on comparing the first attribute to one or more first previously stored attributes, the first attribute having a first weight;

computing a confidence level associated with the first attribute and first weight;

receiving, by the computing system, a request to complete a transaction;

determining a confidence level to complete the transaction;

receiving, by the computing system, a second attribute;

passively updating, by the computing system, the first authentication level to a second authentication level different from the first authentication level based on comparing the second attribute to one or more second previously stored attributes, the second attribute having a second weight;

modifying the confidence level based upon the second attribute and the second weight;

determining the confidence level based upon the second attribute is sufficient to complete the transaction; and completing the transaction, wherein the first and second attributes each comprise an event indicative of the user or a physical characteristic of the user, and wherein each previously stored attribute comprises a previously stored event, a previously stored physical characteristic, or one or more previously determined acceptable values for one or more users.

2. The method of claim 1 wherein the attribute is moving the computing system to a location that is identifiable by the computing system.

3. The method of claim 2 wherein the receiving includes at least one of capturing an image of surroundings using a camera, receiving location information, identifying a name of a data communications network, and identifying a device in a data communications network.

4. The method of claim 1 further comprising:
initially disabling passive authentication; and
enabling passive authentication after storing the first attribute.

5. The method of claim 4 wherein when passive authentication is disabled, requiring the user to actively authenticate before completing a transaction requested by the user.

6. The method of claim 1 wherein the attribute is an indication of making a telephone call.

7. The method of claim 6 wherein the attribute is an indication of a telephone number to which the telephone call is made and the previously stored first attribute is a telephone number stored in a list of contacts.

8. The method of claim 1 wherein the attribute is an indication of a detected temperature.

9. The method of claim 1 wherein the attribute is an indication of a detected motion.

10. The method of claim 1 wherein the attribute is an indication of a detected pressure.

11. The method of claim 1 wherein the attribute is an indication of detecting co-presence of another device.

12. The method of claim 1 wherein the attribute is an indication of a detected recognizing a face.

* * * * *